Oct. 26, 1926.
F. W. MANNING
1,604,649
PROCESS OF AND APPARATUS FOR CONTINUOUS FILTRATION
Filed Jan. 28, 1924  2 Sheets-Sheet 1
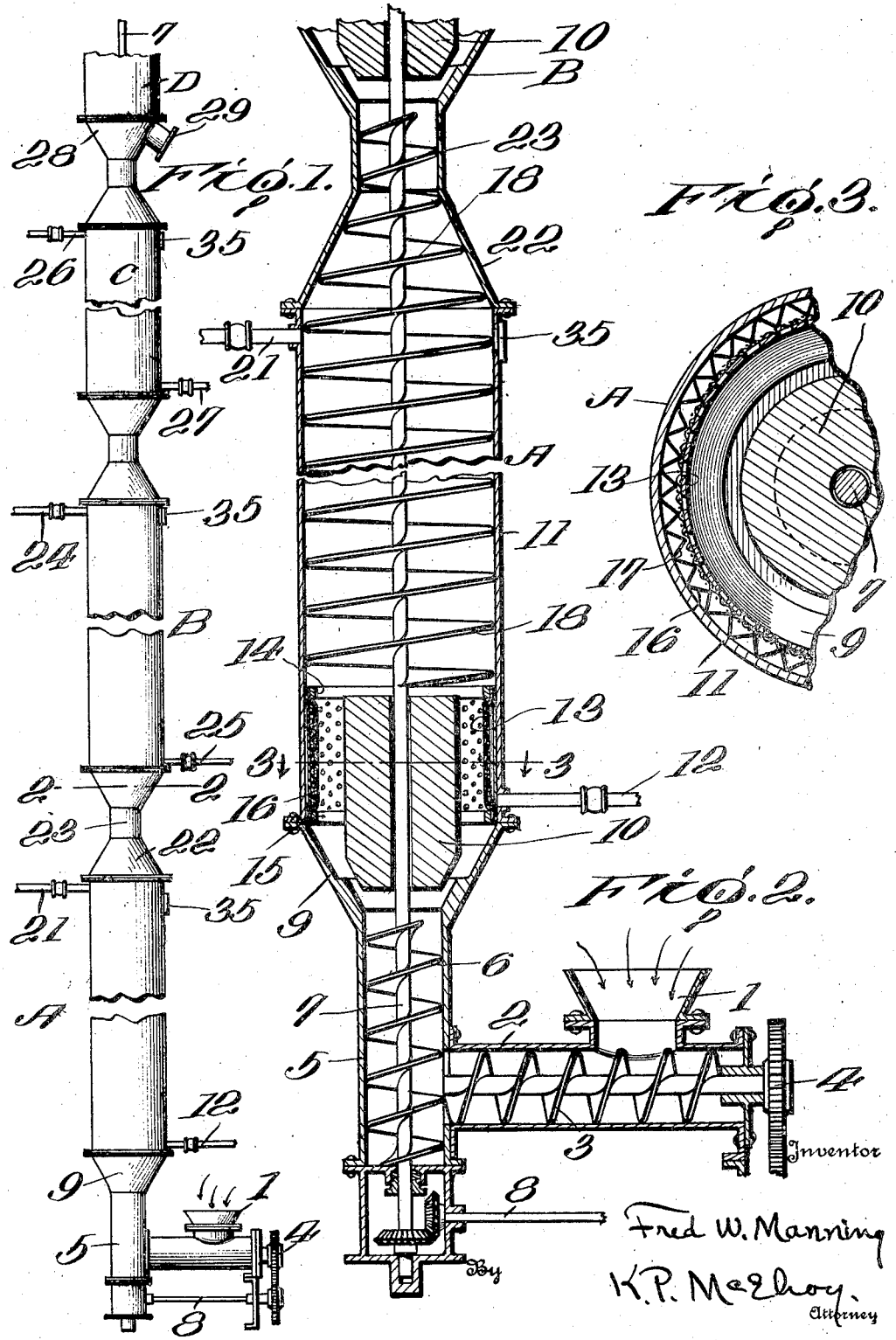
Inventor
Fred W. Manning
K. P. McElroy
Attorney

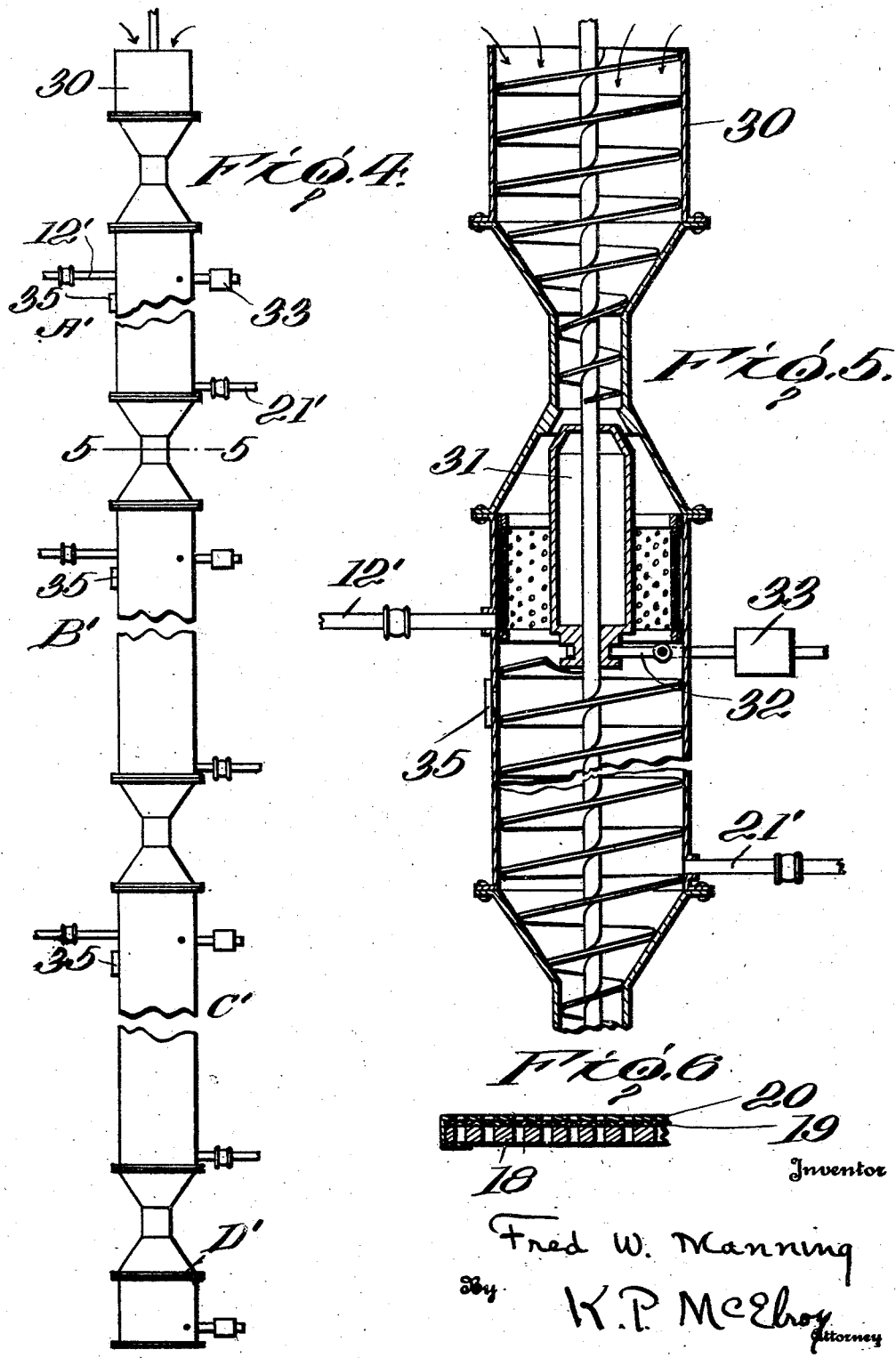

Patented Oct. 26, 1926.

1,604,649

UNITED STATES PATENT OFFICE.

FRED W. MANNING, OF NEW YORK, N. Y.

PROCESS OF AND APPARATUS FOR CONTINUOUS FILTRATION.

Application filed January 28, 1924. Serial No. 689,178.

This invention relates to processes of and apparatus for continuous treatment and pressure filtration; and it comprises a method wherein liquid to be treated and filtered is passed in counter-direction to the treating material to a point of separation therefrom under conditions compacting the treating material at said point of separation, said treating material being washed and reconditioned under similar conditions. The invention further comprises means for delivering treating material as a continuous, moving body through an apparatus, means for compacting it as it enters each section of said apparatus, means for admitting liquid to be treated and for removing used treating material, means for delivering the used treating material to and through washing and conditioning sections of the apparatus, and means for discharging the filtering material after washing and conditioning; all as more fully hereinafter set forth and as claimed.

Attention is also directed to my following copending applications relating to this subject matter—

Serial No. 747,431, filed Nov. 3, 1924;
Serial No. 20,155, filed April 2, 1925; and
Serial No. 37,600, filed June 17, 1925.

In many methods of decolorizing, bleaching, clarifying and otherwise purifying liquids, it is desirable to contact a certain amount of fine or pulverulent material as intimately as may be with a body of liquid to be purified in order to absorb the free suspensoids or dissolved impurities contained in the liquid; and to do this in a continuous way. This is particularly the case in methods of treating oils with fine fuller's earth and sugar solutions with fine bone char, etc. There are many other fine materials which are used in a similar way, such as silica, kieselguhr or diatomaceous earth, decolorizing carbons, etc. Since an adsorbing action is used, the greater the surface of the solid which can be exposed to the liquid, as a rule, the better; and for this reason, fine materials are more efficient than coarser. But there are many mechanical difficulties in the way of quickly and uniformly contacting fine material, such as fuller's earth with liquids, and thereafter separating the two, and particularly where the liquids are of viscous character. Filter presses quickly clog. Therefore, as a rule, relatively coarse material is used in preference to fine and the liquid allowed to percolate through the material in tanks. Sometimes, the liquid and the solid material are mixed and the solids then allowed to settle out. It is difficult in these operations to attain any speed and the purifying, washing, and reconditioning operations are not efficient.

It is an object of the present invention to provide a method of, and apparatus for, continuous high speed treatment of liquids with solids with efficient utilization of the adsorbing powers of the solid material; this process allowing fine material to be used as readily as coarse. I shall hereinafter describe it more particularly as applied to the treatment of oils, and particularly mineral oils, with fuller's earth; but the invention may also be used with other "treating" materials on other liquids. Its advantages, however, appear to the greatest extent in treating mineral oils with fine fuller's earth. While the present method and apparatus may be used with relatively coarse materials, its advantages are particularly apparent with fine materials.

In the present invention, I establish and maintain a slowly moving column of liquid to be treated in a suitable casing, this column being supplied with liquid at one end and liquid being withdrawn at the other. Through this column of liquid I move the required proportion of fine purifying or treating material in a counter-direction, with the aid of apparatus of the screw conveyor type. At the point where the solids are to be separated from the liquid, I ordinarily and advantageously convert the moving solid material into a loosely compacted, constantly renewed cake of standard thickness. While at other points in the system the proportions of solid in the liquid may vary, at the point of separation, or the point of exit of the liquid, it is desirable to have the solid in what may be called a cake of a certain standardized thickness. The conveyor is of perforated metal and is provided with a filtering fabric or the like, to permit forward movement of the liquid through the system independently of the counter-movement of the solid material; that is, so that liquid can pass in a right line counter-current to the forward movement of the solids. The solid treating material is introduced into the system through a coned inlet port with which registers a check valve.

This check valve may be of heavy construction, to offer gravital resistance, and particularly in event that the passage of fine material into the system is upward; but it may be spring-pressed or otherwise positively held in said coned inlet. In this manner, the entering solids are compacted and form, so to speak, their own sealing means against escape of liquid through this inlet. Such a valve also permits intermittent introduction of solid material, which is sometimes convenient. Whenever feed of solid material passing the valve ceases, the valve seats and seals the casing. After use of a treating material in this way, it is in general desirable to wash the material and thereafter to recover the "wash soakage". To this end, in the best embodiment of the present invention, the treating material goes through three or more chambers in a generally similar way; that is, the material leaving the treating chamber passes a check valve to enter a washing chamber, similar to the treating chamber, passes through the washing liquid and then passes against another check valve through a conditioning chamber, also similar to the two previous chambers.

In the accompanying drawings showing two forms of a specific embodiment of my invention and in several views in which, where possible, similar reference numerals designate corresponding parts, Fig. 1 is a view in elevation of a complete structure for utilizing, washing and reconditioning filtering material with upward passage of such material;

Fig. 2 is a view in central vertical section of the lower third of the structure of Fig. 1; the view stopping at line 2—2 on Fig. 1;

Fig. 3 is a fragmental horizontal section along line 3—3 of Fig. 2;

Fig. 4 is a view in elevation of a modified form of apparatus with downward passage of filtering material;

Fig. 5 is a fragmentary view in central vertical section of the apparatus of Fig. 4; the view terminating at line 5—5 on Fig. 4; and Fig. 6 is a fragmentary sectional view of the conveyor used in the other figures.

In Fig. 1, the apparatus is shown as composed of three successive sections, A, B, and C. Section A is shown in Fig. 2. The structure of sections B and C is, however, the same.

Referring first to Figs. 1 and 2, filtering material which, commonly, is of quite fine nature, so that it will pass through a 100-mesh sieve, although it may be coarser, is introduced into the system by hopper 1, entering horizontal conveyor casing 2, containing screw conveyor 3 actuated by power 4. As shown, the horizontal conveyor casing delivers into a vertical casing 5 interiorly provided with an ordinary type of screw conveyor 6, mounted on axial shaft 7. This shaft is driven by drive means 8. The vertical conveyor delivers material to a coned inlet casing within which seats a sort of check valve 10. As shown, this check valve consists of a heavy body of metal with its lower end tapered to conform to the interior of the conical casing. Other means of causing a check valve to offer a positive resistance to the flow of material may be useful; but the simple heavy body of metal loose on the drive shaft which passes through it axially is convenient. As will be seen, solid material delivered by the vertical screw conveyor tends to force this check valve upward and pass between it and the casing as a compacted layer. Above the coned casing is a tubular casing 11 provided with valved outlet pipe 12 for treated liquids. Within the casing is the thin perforated wearing plate 13 spaced away somewhat from the walls of the tubular casing to form an annular liquid passage therebetween. As shown, two rings, 14 and 15, are provided for holding the wearing plate in place. Ordinarily, as shown in Fig. 3, I provide a corrugated, perforated metal spacing element 16 carrying interiorly a fine-meshed woven metal filter cloth 17 and interiorly and over the filter cloth is the wearing plate 13. As shown, the check valve element extends upwardly to a point near the top of the filter elements, forming a restricted annular passageway through which filtering material must pass in its upward progress and in which it becomes more loosely packed, thus allowing the liquid to freely pass out laterally. Above the check valve and filter elements, the interior of casing 11 offers a full width conduit for the passage of solid material and of liquid material, respectively. Mounted on the axial shaft and beginning at a point above the check valve is a conveyor 18 of perforated or foraminous metal (see Fig. 6) carrying on its upper or advancing side a filter cloth 19 which may be held in place and protected by a thin slotted or perforated wearing element 20. Near its top, the tubular casing is provided with valved inlet 21. The several vertical elements so far described are united by flanged joints in a well known way. Surmounting the cylindrical casing is another coned casing 22 into which the conveyor 18 extends. Above this cone is a small tubular conduit 23, being the lower end of section B as shown in Fig. 1. This, in turn, is provided with a chuck valve 10', similar to valve 10 already described.

In the illustration of Fig. 1, A is the section wherein contact of solid material and liquid to be purified is effected; in section B the impregnating liquid, as for example oil, is removed from the solids by means of a suitable solvent, such as naphtha, introduced at 24 and removed at 25. Section C, in turn, is like the others but is used to remove the solvent employed in B. For this purpose, an appropriate fluid (steam in the case of a volatile liquid, such as naphtha) is introduced at 26 and removed at 27. The washed and reconditioned purifying material passes upwardly from the top of C into withdrawal means D. As shown, this means is a simple coned casing 28 provided with an outlet port 29. Usually, I make this casing of sufficient height to take care of fluctuations in supply of material going into it.

In Figs. 4 and 5, the construction is much the same, save that solid materials are introduced into hopper 30 and pass downward successively through the several sections A', B' and C', going to exit in discharging means D'. Liquid to be purified enters A' through 21' and is removed at 12'. With downward passage of solids, the simple gravity controlled check valve of the device of Figs. 1 and 2 cannot be here used. In its place I have shown a counter-weighted check valve 31, normally held up in closed position by lever arm 32 carrying weight 33.

In the operation of the structure of Figs. 1 and 2, presuming oil is to be treated with fuller's earth, sugar solution with decolorizing carbon or bone char, or any other liquid with a purifying adsorbtive solid, any relative proportion of solid and of liquid may be provided in section A, this proportion depending mostly upon all character of material being used. The purifying solids in A may be in the form of a fairly consistent cake or body, but usually they form a sludge with the liquid above the check valve and filter elements and between these a loosely packed cake. What is desirable depends upon the character of the liquid and upon the impurities to be removed. In the lower zones, where the solid materials are compacted as in passing through the coned casing and the channel between the filter elements and the check valve, both the purifying material and the liquid are free from impurities and there is very little difficulty in separating them. The material passing up through the coned casing 9 is compacted and forms a seal against downward passage or escape of liquid, and immediately on entering the tubular casing 11, passes through the annular channel between the check valve and the filter elements where the treated liquid is filtered through it. Passing upward from the cylindrical casing the nearly spent material comes into contact with the untreated liquid entering at 21 and on passing this inlet and entering the coned casing 22 and tubular conduit 23, the solid material is once more compacted and much of the soakage is forced out, draining back into section A and at the same time the material forms its own seal against the escape of liquid at this point. The impregnated spent and comparatively dry material passes into the next section B against the resistance of the check valve and in B it is washed. For example, in the case of fuller's earth used for purifying lubricating oil, residual lubricating oil may be washed out in B by naphtha entering at 24 and leaving at 25. Passing upward and out of B, once more the materials are compacted and form a sealing means. The materials enter C against another check valve and in C they are further treated. Using naphtha as a washing means in B, steam may be blown into C at 26 and removed together with naphtha vapors at 27. Passing upward and outward from C, the materials are once more compacted prior to passing into D. From D, the material is allowed to flow out through 29. By prolonging D upward some distance, a sort of reservoir is provided to take care of fluctuations in delivery.

The operation is exactly the same in the structure of Figs. 4 and 5, save that solid materials are here passed downward instead of upward. In so doing, gravity aids the feed of treating solids in A', B' and C'. Positively acting means, such as the screw conveyors shown, however, should be used in the coned sections to aid in compaction. The several conveyors may, or may not, be independently driven. I regard it as better to mount them, as shown, on a common drive shaft. The conveyors may, or may not, have the same pitch at all points.

In the described apparatus, continuous operation is effected with maximum utilization of the decolorizing or purifying material. The admixture of solid and liquid is intimate. No channeling can occur. Similarly, maximum utilization of washing solvent is attained in B. The process and apparatus may be readily employed to give continuous operation and clear filtrates, using minimum proportions of intimately admixed solid materials to purify the liquid. The constant progression of a loosely packed cake of just sufficient thickness to give clarity to the filtrate, with the purified condition of the liquid before passing through the cake, makes for high rate of filtering speed. By arranging three sections of apparatus in the way shown for straight-line movement of solid material therethrough, much collateral apparatus in the way of tanks and pumps is saved. Not much floor space is required with the vertical arrangement, and the continuous operation requires but little labor.

What I claim is:—

1. A treating and filtering process consisting of introducing a treating agent into a chamber containing a liquid, immediately filtering a treated portion of the liquid through the agent, and thereafter treating that portion of the liquid yet to be filtered by mixing the agent with such portion.

2. A treating and filtering process consisting of introducing a treating agent into a chamber containing a liquid, immediately filtering a treated portion of the liquid through the agent while in filter cake form, and thereafter treating that portion of the liquid yet to be filtered by passing the agent in less compact form through such portion.

3. A continuous treating and filtering process consisting of continuously moving a treating agent in relatively compact form over a filter wall within an enclosed chamber, of continuing the movement of the agent in less compact form through a treating counter current chamber in which it passes through and treats a liquid moving in the opposite direction, and passing the treated liquid through the more compact treating agent and the filter wall.

4. A treating and filtering process consisting of feeding treating solids into a chamber, of building up a filter cake therefrom within the chamber, of moving the cake over and off of a permanent filter wall while such cake is directly in contact with the wall prior to the utilization of its treating values, of building up further filter cake at the end of the wall and moving the same over the wall to take the place of and simultaneously with the movement of the first filter cake off the wall, and moving the said first cake solids on through the chamber in intimate contact with incoming liquid whereby the treating values of the solids are utilized to treat the liquid before filtering the same through the said further filter cake.

5. A continuous treating and filtering process consisting of feeding treating solids into a chamber, of continuously building up a filter cake therefrom within the chamber, of continuously moving the cake over and off of a permanent filter wall while such cake is directly in contact with the wall prior to the utilization of its treating values, of continuously building up further filter cake at the end of the wall and continuously moving the same over the wall to take the place of and simultaneously with the movement of the first filter cake off the wall, and continuously moving the said cake solids on through the chamber in intimate contact with the incoming liquid whereby the treating values of the solids are utilized to treat the liquid before filtering the same through the said further filter cake.

6. A treating and filtering process consisting of forcing a liquid under pressure into an enclosed chamber and through the chamber toward one end thereof, feeding treating solids into the chamber adjacent the said one end, of building up certain of such solids into a filter cake, of moving the cake over and off of a permanent filter wall, while such cake is directly in contact with the wall prior to the utilization of its treating values, of building up further filter cake at the end of the wall and moving the same over the wall to take the place of and simultaneously with the movement of the first cake off the wall, and moving the said first cake solids on through the chamber in intimate contact with and counter currently to the incoming liquid whereby the treating values of the solids are utilized to treat the liquid before filtering the same through the said further filter cake.

7. A treating and filtering process consisting of forcing loose treating solids into a closed chamber and advancing the same through the chamber in suspension in a liquid to be treated and filtered, forcing the said liquid into and through the chamber in a direction counter to the movement of the solids in a manner thoroughly contacting the solids and liquid in a portion of the chamber adjacent the end wherein the liquid is introduced, and separating the treated liquid from the solids by filtering through certain of the solids adjacent the end of the chamber wherein the solids are introduced.

8. A treating and revivifying process consisting of passing a treating agent of solids in one direction through a liquid moved in a counter-direction in an enclosed chamber, and of continuing the movement of the treating agent into and through a second chamber while passing a washing fluid therethrough in a counter-direction.

9. A treating and revivifying process consisting of passing a treating agent of solids in one direction through a liquid moved in a counter-direction in an enclosed chamber, of thereafter filtering the treated liquid through solids and a filter wall within the chamber, and of continuing the movement of the treating agent into and through a second chamber while passing a washing fluid therethrough in a counter-direction.

10. A treating and revivifying process consisting of passing a treating agent of solids in one direction through a liquid agent moved in a counter direction in an enclosed chamber, of continuing the movement of the treating agent into and through a second chamber while passing a washing liquid therethrough in a counter-direction, and thereafter continuing the movement of the treating agent into and through a third chamber while passing a washing and reconditioning fluid therethrough in a counter-direction.

11. A treating and revivifying process consisting of passing a treating agent in one direction through a liquid moved under pressure in a counter-direction in an enclosed chamber, and of continuing the movement of the treating agent into and through a second chamber while passing a washing liquid therethrough under pressure in a counter-direction.

12. A continuous treating and filtering process consisting of continuously introducing a fine or pulverulent treating agent into a liquid containing impurities in one portion of a closed chamber, of continuously passing said agent through the chamber and separating said agent with certain of the said impurities from the liquid in another portion of the chamber, and of continuously passing the resultant sludge to another chamber and washing the same to separate the impurities therefrom.

13. A treating and filtering apparatus comprising a closed casing, means for admitting liquid to be treated and for removing filtrate from the casing, and filtering means for moving a treating agent through the casing in counter direction to the movement of the liquid.

14. A treating and filtering apparatus comprising a closed casing, means for delivering a treating agent thereto, means in the casing for compacting the said treating agent as it is delivered, filtering means beyond said compacting means for advancing the treating agent through the casing, and inlet and outlet means for supplying liquid to be treated and removing it from the casing, the arrangement of such filtering means and inlet and outlet being such that the said agent is moved through the casing in counter direction to the movement of the liquid.

15. A treating and filtering apparatus comprising a plurality of closed casings in communication through restricted passages, means for delivering a treating agent to one of said casings, means for moving the treating agent therethrough, means for removing the treating agent therefrom and delivering it to the next said casing through one of the said restricted passages, and means for delivering liquid to each casing at one point and removing it at another point so arranged that the treating agent is thoroughly contacted with said liquid and the liquid filtered therefrom as the said treating agent advances through the casings.

16. A treating and filtering apparatus comprising a closed casing having a filter portion in one end thereof and a counter-current portion, a screw comprising spiral filter flights extending longitudinally through the casing and adapted to advance a treating agent longitudinally therethrough, means providing a filter wall and a filtrate outlet in the filter portion of the casing, and means providing an inlet in the casing for admitting liquid to be treated, the inlet and said outlet and the said screw and casing being so arranged that the liquid to be treated travels through the casing in a direction opposed to the direction of travel of said treating agent and is thoroughly contacted with the agent in the countercurrent portion of the casing before reaching the filter portion.

17. A treating and filtering apparatus comprising a closed casing, entrance and exit means respectively adjacent the opposite ends thereof, means for forcing treating solids through the entrance into the casing and out of the exit, means providing an inlet adjacent said exit end of the casing for admitting liquid to be treated, means providing a filter chamber adjacent to the said entrance end of the casing, means providing an outlet for drawing off the filtrate from the filter chamber, the greater portion of the casing, between the filter chamber and the said exit, forming a counter-current chamber wherein the liquid is thoroughly contacted and treated with the solids before reaching the filter chamber, and means in the said counter-current chamber for advancing the solids therethrough and over the filter wall.

18. A treating and filtering apparatus comprising a closed casing, means for advancing a treating agent therethrough, a filter wall spaced away from the casing and forming a filter chamber in one end of the casing, means providing an inlet into the casing for admitting liquid to be treated, and means within the filter chamber portion of the casing for compacting the treating agent as it passes therethrough.

19. A treating and filtering apparatus comprising a closed casing, means for delivering a treating agent thereinto, movable valve means within the casing for resisting delivery of such agent thereinto, whereby the agent is compacted as it is delivered to the casing, and means for moving the treating agent from the point where it is compacted through the said casing.

20. A treating and filtering apparatus comprising a casing having a restricted entrance opening for a treating agent, means for delivering the treating agent through said opening, a valve at said restricted opening in the casing, arranged to be opened by the treating agent delivered, and filtering means in the casing beyond the valve for moving the treating agent through the casing in counter direction to the liquid movement after it has been forced past said valve.

21. A treating and filtering apparatus comprising a casing, a conveyor therein for moving a treating agent therethrough, means for delivering the treating agent thereto, a valve between the said delivery means and said conveyor, a valve seat in the casing for said valve, and a filtering chamber surrounding said valve.

22. A treating and filtering apparatus comprising a filtering casing, means for delivering a treating agent thereinto at one point, means for removing the treating agent therefrom at another point, means within the casing intermediate said delivery and removing means for sealing said casing upon discontinuous introduction of a treating agent, and filtering means for moving the treating agent through the casing in counter direction to the liquid movement.

23. A treating and filtering apparatus comprising a closed casing, means for forcing a treating agent thereinto under pressure, filtering means for moving the agent through the casing, means for moving the treating agent through an outlet of the casing, a filter wall adjacent the treating agent inlet, means adjacent the treating agent outlet for admitting the liquid to the casing, such liquid passing through the casing in a direction counter to the movement of the agent, and means for withdrawing the liquid from the casing after it has passed through the filter wall.

24. A treating and filtering apparatus comprising a plurality of closed casings inter-connected by restricted openings, means for feeding a treating agent into one end of one casing, filtering means for moving said agent and a liquid through such casing in opposite directions, means for moving said agent through the restricted opening into the adjacent casing, and means in the other casings for continuing the movements of the agent and a liquid in like manner, and means for forcing liquid through each casing in a direction counter to the movement of the agent.

In testimony whereof, I have hereunto affixed my signature.

FRED W. MANNING.